United States Patent [19]
Grünbacher et al.

[11] Patent Number: 5,514,203
[45] Date of Patent: May 7, 1996

[54] PROCESS FOR PRODUCING AN IRON MELT

[75] Inventors: Herbert Grünbacher, St. Marien; Leopold-Werner Kepplinger, Leonding, both of Austria; Franz Reufer, Düsseldorf, Germany; Günter Schrey, Linz, Austria

[73] Assignee: Deutsche Voest Alpine Industrieanlagenbau GmbH, Germany

[21] Appl. No.: 419,146

[22] Filed: Apr. 10, 1995

[30] Foreign Application Priority Data

Apr. 11, 1994 [AT] Austria ........................ 739/94

[51] Int. Cl.⁶ ............................................. C21B 11/00
[52] U.S. Cl. ................................... 75/492; 75/961
[58] Field of Search ............................. 75/961, 492

[56] References Cited

U.S. PATENT DOCUMENTS

| | | | |
|---|---|---|---|
| 3,770,415 | 11/1973 | Carignani et al. | 75/750 |
| 3,851,827 | 12/1974 | Carignani et al. | 241/65 |
| 4,699,655 | 10/1987 | Milionis | 266/160 |
| 5,364,441 | 11/1994 | Worner | 75/961 |

FOREIGN PATENT DOCUMENTS

| | | |
|---|---|---|
| 376241 | 10/1984 | Austria . |
| 2122529 | 4/1994 | Canada . |
| 06236684 | 4/1994 | European Pat. Off. . |
| 2044669 | 9/1970 | Germany . |
| 4123626 | 1/1993 | Germany . |

*Primary Examiner*—Melvyn Andrews
*Attorney, Agent, or Firm*—Ostrolenk, Faber, Gerb & Soffen

[57] ABSTRACT

In a process for producing an iron melt, iron ore is reduced to sponge iron in a direct reduction zone. The sponge iron is melted in a meltdown gasifying zone while supplying carbon-containing material under gasification of the carbon-containing material to reducing gas and under formation of a slag. The reducing gas is injected into the direct reduction zone, is reacted there and is drawn off as a top gas. The reducing gas and/or the top gas is subjected to gas scrubbing and the sludges separated during scrubbing are admixed with binder and coal dust and subsequently are agglomerated. In order to be able to supply back to the direct reduction process in large amounts sludges incurring in the direct reduction of iron ore without disturbing the process course of the direct reduction in any way, the sludges separated during scrubbing are dehydrated to a residual moisture content prior to being further treated, coal dust and, as a binder, quick lime are then admixed to the sludges, the sludges subsequently are granulated and the granulate thus formed is supplied to the meltdown gasifying zone while increasing the basicity of the slag to a maximum of 1.25.

8 Claims, 1 Drawing Sheet

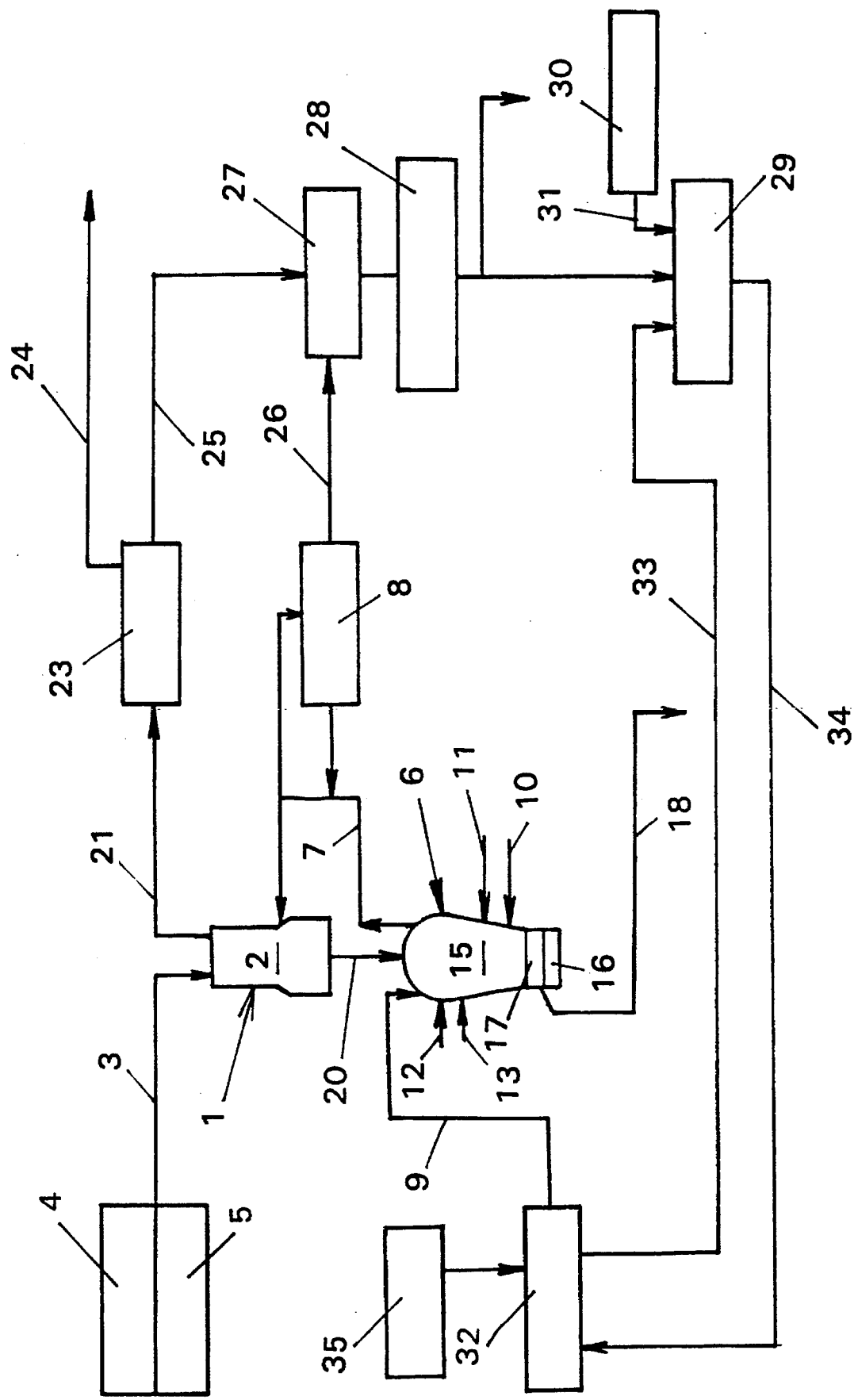

PROCESS FOR PRODUCING AN IRON MELT

BACKGROUND OF THE INVENTION

The invention relates to a process for producing an iron melt, wherein iron ore is reduced to sponge iron in a direct reduction zone, the sponge iron is melted in a meltdown gasifying zone while supplying carbon-containing material under gasification of the carbon-containing material to reducing gas and under formation of a slag and the reducing gas is injected into the direct reduction zone, is reacted there and is drawn off as a top gas, the reducing gas and/or the top gas being subjected to gas scrubbing and the sludges separated during scrubbing being mixed with binder and coal dust and subsequently agglomerated.

A process of this type is known from AT-B-376,241. There, the reducing gas, after the separation of solids, as well as the top gas emerging from the direct reduction zone are subjected to gas scrubbing in cyclones and the sludges separated are mixed with binder comprised of iron oxide dust, hard pitch, bitumen or bituminous brown coal, are hot-briquetted and are supplied to the meltdown gasifying zone, the iron oxide dust coming from a blast furnace gas purification arrangement.

The solids incurring in solids separation—primarily dust coal—are recycled to the lower region of the meltdown gasifying zone almost entirely; a small portion of the dust coal is mixed with the sludges mingled with binder and is briquetted together therewith.

In doing so, it is disadvantageous that, due to the elevated amount of iron oxides introduced, reduction work has to be done in the melter gasifier in order to reduce the iron oxide, energy required for the melting procedure, thus, being withdrawn from the same and the process occurring within the meldown gasifying zone being disturbed. Moreover, hot-briquetting is an expensive solution in terms of investment and operational costs.

From DE-A-41 23 626 it is known to agglomerate metallurgical residual substances by using binding agents, slag formers and reducing agents and to introduce the agglomerates into the upper burden region of a melting aggregate, preheating and drying of the agglomerates taking place in this burden region of the melting aggregate. The burden passes through the melting aggregate according to the counterflow principle, at first reaching a reduction zone provided within the melting aggregate and subsequently being melted in the lower region of the melting aggregate. This known process requires much energy inasmuch the waste and/or residual substances must be dried and sintered in the melting aggregate, thus adversely affecting the process that takes place within the melting aggregate.

Also in this case, reduction work must be done in the melter gasifier on account of the introduction of iron oxides (such as, e.g., scales), which additionally calls for a considerable amount of energy. Furthermore, it is proposed to use, for instance, sulfite liquors as binders, which, however, results in an undesired introduction of sulfur into the process.

The invention aims at avoiding these disadvantages and has as its object to supply back to the direct reduction process the sludges incurring in the direct reduction of iron ore in amounts as large as possible, i.e., in amounts of approximately 90% of the total amount of sludges, without influencing the process course of the direct reduction in any way. In particular, no changes in the amounts of raw materials and fluxes are to be necessary.

In accordance with the invention, this object is achieved by the combination of the following measures:

that the sludges separated during scrubbing are dehydrated to a residual moisture content prior to being further treated, that, after this, coal dust and, as a binder, quick lime are admixed to the sludges, that the sludges subsequently are granulated, and that the granulate thus formed is supplied to the meltdown gasifying zone while increasing the basicity of the slag to a maximum of 1.25, preferably to a maximum of 1.20.

Preferably, the sludges are dehydrated to a residual moisture content of 25 to 50%, preferably 35 to 40%, before further treatment. Thereby, sludge having such a residual moisture content can be directly charged into a mixer granulator. The preferred range of residual moisture content results in a quantitatively favorable consumption of quick lime. Without such dehydration, a considerably higher consumption of quick lime would be necessary to obtain a sufficient strength of the granulate.

Suitably, coal dust is added to the dehydrated sludges in an amount ranging up to 30%, preferably up to 25%, of the amount of dehydrated sludge. Coal dust in the amount mentioned positively influences the strength of the granulate. The use of coal dust from dedusting arrangements of a coal drying installation, which is incorporated in the present concept of producing an iron melt or pig iron and/or steel pre-products, is particularly advantageous for reasons of environmental protection, avoiding transportation and dumping costs for the coal dust. Furthermore, the addition of coal dust to the dehydrated sludge has the advantage that the granulates subsequently formed within the mixer granulator have a considerable carbon content, the coal dust positively contributing to the energy supply as an energy carrier after having charged the granulates into the meltdown gasifying zone.

According to a preferred variant, the granulates are provided with a carbonate layer by exposure to a $CO_2$-containing smoke gas before being supplied to the meltdown gasifying zone. Such a carbonate layer increases both the strength for transportation and the disintegration strength within the meltdown gasifying zone.

Suitably, the formation of a carbonate layer for the granulates is realized in a coal drying arrangement.

BRIEF DESCRIPTION OF THE DRAWINGS

In the following, the invention will be explained in more detail by way of an exemplary embodiment illustrated in the sole drawing FIGURE, which is a schematic illustration of an arrangement for carrying out the process according to the present invention.

DETAILED DESCRIPTION OF THE PREFERRED EMBODIMENT

Lumpy iron-oxide-containing charging substances 4, such as ore, if desired, along with uncalcined fluxes 5, are top-charged via a supply duct 3 into a direct reduction arrangement designed as s shaft furnace 1, i.e., into its direct reduction zone. The shaft furnace 1 is in communication with a melter gasifier 6, in which a reducing gas is produced from carbon carriers and oxygen-containing gas, which is fed to the shaft furnace 1 through a supply duct 7, a gas purification and a gas cooling means 8 designed as a scrubber being provided in the feed duct 7.

The melter gasifier 6 comprises a supply duct 9 for solid lumpy carbon carriers, if desired, several supply ducts 10, 11 for oxygen-containing gases and supply ducts 12, 13 for carbon carriers that are liquid or gaseous at room temperature, such as hydrocarbons, as well as for calcined fluxes. In the melter gasifier 6, molten pig iron 16 and molten slag 17 collect below the meltdown gasifying zone 15 and are tapped via a tap 18.

The lumpy charging materials reduced to sponge iron in the direct reduction zone 2 of the shaft furnace 1 are supplied to the melter gasifier 6 through one or several ducts 20, for instance, by means of delivery worms. A discharge duct 21 for the top gas forming in the direct reduction zone 2 joins the upper part of the shaft furnace 1. This top gas is fed to a gas purification means 23, which likewise is designed as a gas scrubber, and subsequently is available for any further use via an export gas duct 24.

According to the invention, waste substances incurring in the gasification and meltdown process as well as in the reduction process are recycled into the iron-producing process:

The sludge waters incurring in the scrubbers 8 and 23 are supplied to a thickener 27 via sludge-water ducts 25 and 26 and, after this, to a dehydration means 28, preferably a decanter centrifuge 28, in which the sludges are dehydrated to a residual moisture content of from 25 to 50%, preferably from 35 to 40%. The dehydrated sludge is supplied to a granulation means 29, such as a mixer granulator 29, in an amount of 90%, preferably up to 95%. A portion of the dehydrated sludge, i.e., 5 to 10%, is sleuced out and dumped. In this manner, the build-up of undesired sludge ingredients, such as, e.g., heavy metal compounds, can be prevented.

A duct 31 supplying quick lime 30 as well as a duct 33 supplying coal filter dust derived from a coal drying arrangement 32 run into the granulation means 29. The granulates formed in the granulation means 29 are supplied to the coal drying arrangement 32 via a conveying means 34 and, together with the coal 35 dried in the coal drying arrangement 32, are supplied to the melter gasifier 6 via supply duct 9.

According to an exemplary embodiment, sludge water coming from the gas purification means 23 and from the gas cooling means 8 and having a solids content of about 100 to 200 g/l, said solids consisting of carbon by about 30%, of iron oxides by about 30%, the balance being ash components, primarily aluminum and silicon oxides as well calcium and magnesium hydroxides besides other metal oxides occurring in slight quantities, was dehydrated by aid of the decanter centrifuge 28. About 850 kg of the obtained sludge having a residual moisture content of 38% were directly charged into the mixer granulator 29. In addition, about 200 kg coal and about 200 kg quick lime were weighed into the mixer granulator 29.

After mixing and granulating, about 1,250 kg granulates having a water content of aobut 20% were discharged from the mixer granulator 29 and supplied to the coal drying arrangement 32. There, drying of the granulates to a residual moisture content of 5% at most was effected under the action of a $CO_2$-containing smoke gas. Thereby, the granulates also received a carbonate surface layer.

In the melter gasifier 6, the slag basicity $B_4$ defined by $$B_4 = \frac{CaO + MgO}{SiO_2 + Al_2O_3}$$

usually is adjusted to a value of 1.15. Thereby, sufficient viscosity and sufficient desulfurization ability of the slag are ensured. With the slag basicity $B_4$ increasing, the inclination to absorbing sulfur rises, yet also the tenacity of the slag increases. An elevated slag tenacity is undesired in slag tapping.

When recycling the sludges into the melter gasifier in the form of granulates in an amount of about 10% of the coal charge, the slag basicity $B_4$, according to the invention, increases to a maximum of 1.20.

Up to this value, no change in the amounts of raw materials and fluxes is required; nor is the process course affected. This means that granulates up to 10% of the coal charge may be charged into the melter gasifier without having to vary the process as well as the amounts of raw materials and fluxes.

In this manner, 90 to 95% of the total amount of sludge incurred—depending on the heavy metal load of the sludge—can be returned into the process.

What we claim is:

1. In a process for producing an iron melt by providing a direct reduction zone and reducing iron ore in said direct reduction zone so as to obtain sponge iron, providing a meltdown gasifying zone and melting said sponge iron in said meltdown gasifying zone while supplying carbon-containing material under gasification of said carbon-containing material to reducing gas and under formation of a slag, introducing said reducing gas into said direct reduction zone and reacting it in said direct reduction zone so as to obtain top gas, and drawing off said top gas, wherein at least one of said reducing gas and said top gas is subjected to scrubbing whereby a sludge is formed and said sludge is separated during scrubbing and mixed with binder and coal dust and subsequently is agglomerated, the improvement comprising dehydrating said sludge separated during scrubbing to a residual moisture content prior to being further treated, adding coal dust and, as said binder, quick lime to said sludge having been dehydrated, granulating said sludge so as to obtain a granulate, and supplying said granulate to said meltdown gasifying zone whi increasing the basicity of said slag to a maximum of 1.25, said basicity being defined by $B_4$ in the formula $$B4 = \frac{CaO + MgO}{SiO_2 + Al_2O_3} .$$

2. A process as set forth in claim 1, wherein the basicity of said slag is increased to a maximum of 1.20.

3. A process as set forth in claim 1, wherein said sludge is dehydrated to a residual moisture content ranging from 25 to 50% prior to being further treated.

4. A process as set forth in claim 1, wherein said sludge is dehydrated to a residual moisture content ranging from 35 to 40% prior to being further treated.

5. A process as set forth in claim 1, wherein coal dust in an amount of up to 30% of the amount of said dehydrated sludge is added to said dehydrated sludge.

6. A process as set forth in claim 1, wherein coal dust in an amount of up to 25% of the amount of said dehydrated sludge is added to said dehydrated sludge.

7. A process as set forth in claim 1, further comprising providing a carbonate layer on said granulate by exposure to a $CO_2$-containing smoke gas prior to supplying said granulate to said meldown gasifying zone.

8. A process as set forth in claim 7, wherein said carbonate layer for said granulate is formed in a coal drying means.

* * * * *